United States Patent
Swarbrick et al.

(10) Patent No.: US 10,628,547 B1
(45) Date of Patent: Apr. 21, 2020

(54) ROUTING CIRCUIT DESIGNS FOR IMPLEMENTATION USING A PROGRAMMABLE NETWORK ON CHIP

(71) Applicant: Xilinx, Inc., San Jose, CA (US)

(72) Inventors: Ian A. Swarbrick, Santa Clara, CA (US); Dinesh D. Gaitonde, Fremont, CA (US); Henri Fraisse, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 237 days.

(21) Appl. No.: 15/639,485

(22) Filed: Jun. 30, 2017

(51) Int. Cl.
  *G06F 17/50* (2006.01)
  *G06F 9/4401* (2018.01)
(52) U.S. Cl.
  CPC ........ *G06F 17/5077* (2013.01); *G06F 9/4403* (2013.01); *G06F 17/5009* (2013.01); *G06F 2217/06* (2013.01)
(58) Field of Classification Search
  USPC ...................................................... 716/126
  See application file for complete search history.

(56) References Cited

U.S. PATENT DOCUMENTS

| | | | |
|---|---|---|---|
| 5,648,913 A | 7/1997 | Bennett et al. | |
| 5,659,484 A | 8/1997 | Bennett et al. | |
| 5,971,595 A | 10/1999 | Grant et al. | |
| 6,086,629 A | 7/2000 | McGettigan et al. | |
| 6,308,309 B1 | 10/2001 | Gan et al. | |
| 7,073,149 B2 | 7/2006 | Knol et al. | |
| 7,185,309 B1 | 2/2007 | Kulkarni et al. | |
| 7,251,804 B1 | 7/2007 | Trimberger | |
| 7,281,093 B1 | 10/2007 | Kulkarni et al. | |
| 7,367,007 B1 | 4/2008 | Sundararajan et al. | |
| 7,500,060 B1 | 3/2009 | Anderson et al. | |
| 7,574,680 B1 | 8/2009 | Kulkarni et al. | |
| 7,650,248 B1 | 1/2010 | Baxter | |
| 8,006,021 B1 | 8/2011 | Li et al. | |
| 8,020,163 B2* | 9/2011 | Nollet | G06F 15/7825 370/400 |
| 8,104,011 B1 | 1/2012 | Sundararajan et al. | |
| 2003/0167348 A1* | 9/2003 | Greenblat | H04L 12/42 709/251 |
| 2003/0172189 A1* | 9/2003 | Greenblat | G06F 15/78 709/251 |

OTHER PUBLICATIONS

U.S. Appl. No. 15/623,302, filed Jun. 14, 2017, Fraisse, H., "Incremental Routing for Circuit Designs Using a Sat Router".

(Continued)

*Primary Examiner* — Mohammed Alam
(74) *Attorney, Agent, or Firm* — Cuenot, Forsythe & Kim, L.L.C.

(57) ABSTRACT

Routing a circuit design for implementation in an integrated circuit having a programmable network on chip can include determining Quality of Service (QOS) parameters for data flows of a circuit design, wherein the data flows involve transfers of data between masters and slaves through the programmable network on chip and generating, using a processor, an expression having a plurality of variables representing the data flows, routing constraints, and the QOS parameters. A routing solution can be determined using the processor for the data flows of the circuit design by initiating execution of a SAT solver using the expression.

18 Claims, 4 Drawing Sheets

(56) References Cited

OTHER PUBLICATIONS

Cho, M. et al., "BoxRouter: A New Global Router Based on Box Expansion and Progressive ILP," In ACM Proc. of DAC 2006, Jul. 24-28, 2006, pp. 373-378.

Dally, W.J. et al., "Deadlock-Free Message Routing in Multiprocessor Interconnection Networks," In IEEE Trans. on Computers, vol. 36, No. 5, May 1987, pp. 547-553.

Wood, R. et al., "FPGA Routing and Routability Estimation Via Boolean Satisfiability," IEEE Transactions on Very Large Scale Integration (VLSI) Systems, vol. 6, No. 2, Jun. 1998, 10 pg.

Nam, G. et al., "A New FPGA Detailed Routing Approach Via Search-Based Boolean Satisfiability," IEEE Transactions on Computer-Aided Design of Intergrated Circuits and Systems, vol. 21, No. 6, Jun. 2002, 11 pg.

McMurchie, L. et al., "PathFinder: A Negotiation-Based Performance-Driven Router for FPGAs," In Proc. ACM/IEEE Int'l. Sym. Field Programmable Gate Arrays, Feb. 1995, 7 pg.

Fraisse, H. et al., "Boolean Satisfiability-Based Routing and Its Applicaiton to Xilinx UltraScale Clock Network," In Proc. of 2016 ACM/SIGDA Int'l. Sym. on Fieldl-Programmable Gate Arrays, Feb. 2016, 6 pg.

Hu, J. et al., "Sidewinder: A Scalable ILP-Based Router," In Proc. of 2008 Int'l. Workshop on System Level Interconnect Prediction, Apr. 5-8, 2008, 7 pg.

Nam, G. et al., "A Comparative Study of Two Boolean Formulations of FPGA Detailed Routing Constraints," IEEE Trans. on Computers, vol. 53, No. 6, Jun. 2004, 9 pg.

\* cited by examiner

ROUTING CIRCUIT DESIGNS FOR IMPLEMENTATION USING A PROGRAMMABLE NETWORK ON CHIP

FIELD OF THE INVENTION

This disclosure relates to routing circuit designs for implementation using a programmable network on chip (NOC).

BACKGROUND

A "network on chip" or "NOC" refers to a communication subsystem, or network, that is implemented within an integrated circuit (IC) or chip. The NOC is a packet-switched network that facilitates communication between different circuits such as intellectual property cores, processors, and other circuitry implemented in the IC. Typically, NOCs are implemented using a fixed network topology such as mesh or torus. In the case of an application specific IC (ASIC), for example, the masters and slaves of the NOC are known prior to implementation of the ASIC. Thus, the NOC is custom built to suit the requirements of the application to be implemented within the ASIC.

SUMMARY

One or more embodiments are directed to methods for routing a circuit design for implementation in an integrated circuit (IC) having a programmable network on chip (NOC). In one aspect, a method can include determining Quality of Service (QOS) parameters for data flows of a circuit design, wherein the data flows involve transfers of data between masters and slaves through the programmable NOC, generating, using a processor, an expression having a plurality of variables representing the data flows, routing constraints, and the QOS parameters, and determining, using the processor, a routing solution for the data flows of the circuit design by initiating execution of a SAT solver using the expression.

One or more embodiments are directed to systems for routing a circuit design for implementation in an IC having a programmable NOC. In one aspect, a system includes a memory configured to store program code and a processor coupled to the memory. The processor, in response to executing the program code, is configured to initiate operations. The operations include determining QOS parameters for data flows of a circuit design, wherein the data flows involve transfers of data between masters and slaves through the programmable NOC, generating, using a processor, an expression having a plurality of variables representing the data flows, routing constraints, and the QOS parameters, and determining, using the processor, a routing solution for the data flows of the circuit design by initiating execution of a SAT solver using the expression.

One or more embodiments are directed to a device. The device may be an IC. The device can include a processor configured to execute program code and a programmable circuitry. The device can include a programmable NOC coupling the processor and the programmable circuitry. The programmable NOC is configured, in response to booting the device, to implement routes between the processor and the programmable circuitry.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to routing circuit designs for implementation using a programmable network-on-chip (NOC). In one or more embodiments, a programmable NOC is provided within an integrated circuit (IC). The IC may include programmable circuitry in addition to the programmable NOC. As such, the master circuits and the slave circuits that send and receive the data flows that are to be routed through the NOC are unknown until a circuit design is created for implementation within the IC. Unlike custom built NOC solutions, the programmable NOC is pre-implemented within the IC. While the programmable NOC itself is not physically modifiable, the programmable NOC may be programmed to establish connectivity between master circuits and slave circuits for different user circuit designs. The programmable NOC is capable of adapting to different circuit designs with different combinations of master circuits and slave circuits with differing locations in the IC.

In accordance with the inventive arrangements described within this disclosure, a routing solution for a programmable NOC is determined. In one or more embodiments, a set of data flows of a circuit design that are to be routed through the programmable NOC are determined. Quality of Service (QOS) parameters are assigned to the data flows. Given the data flows and the QOS parameters, a system is capable of generating a routing solution for the programmable NOC that complies with the QOS requirements and that avoids deadlock conditions in the programmable NOC.

One or more embodiments utilize a satisfiability (SAT) solver to determine the routing solution. As an illustrative and non-limiting example, the data paths, QOS parameters, aspects of the programmable NOC, and constraints for solving the routing problem are encoded into an expression that is provided to the SAT solver. The SAT solver executes using the expression to determine a SAT solution for the routing problem. The SAT solution is translated into a routing solution for the data flows of the circuit design through the programmable NOC.

Conventional routers used with NOCs generate routes by developing a NOC with a customized and fixed topology for the particular circuit design at hand. Once the NOC is developed, the topology may not be changed. Further, a QOS scheme is applied to transactions that flow through the developed NOC. In this regard, the NOC is designed and created to be deadlock free. In other words, the NOC is designed to provide one path for a given source-destination pair.

In accordance with the inventive arrangements described within this disclosure, routes for data flows are determined given the existence of a programmable NOC. In one or more embodiments, QOS parameters are applied to the data flows. As such, the routes are generated to meet the QOS parameters of the data flows. Further, a programmable NOC, by its nature, provides multiple possible paths for a given source-destination pair. Given this feature of a programmable NOC, deadlocks may be avoided by enforcing constraints that ensure that the routes are free of cycles.

While the example embodiments provided within this disclosure are described with reference to programmable NOCs, it should be appreciated that the example embodiments may be used and/or applied to routing any NOC in which more than one path for each source-destination pair exists.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Where considered appropriate, reference numbers are repeated among the figures to indicate corresponding, analogous, or like features.

Figure 1:
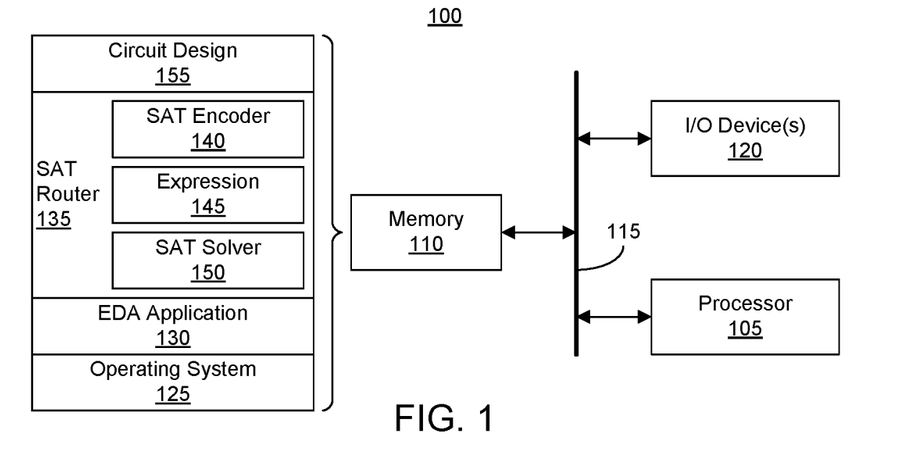
FIG. 1 illustrates an example of a data processing system for use with one or more embodiments described herein.

FIG. 1 illustrates an example data processing system (system) 100 for use with the example embodiments described within this disclosure. System 100 includes one or more processors 105 coupled to memory 110 through interface circuitry 115. System 100 stores program code within memory 110. Processor 105 executes the program code accessed from memory 110 via interface circuitry 115. In one aspect, system 100 is implemented as a computer or other data processing system that is suitable for storing and/or executing program code.

It should be appreciated, however, that system 100 can be implemented in the form of any system including a processor and memory that is capable of performing the functions described within this disclosure. In another embodiment, system 100 may be implemented as a system-on-chip having a processor coupled to programmable circuitry and a NOC.

Memory 110 includes one or more physical memory devices such as, for example, a local memory and one or more bulk storage devices. Examples of local memory include, but are not limited to, RAM(s) or other non-persistent memory device(s) generally used during actual execution of the program code. Examples of a bulk storage device include, but are not limited to, a hard disk drive (HDD), a solid state drive (SSD), or other persistent data storage device. System 100 may also include one or more cache memories (not shown) that provide temporary storage of at least some program code to reduce the number of times program code must be retrieved from a bulk storage device during execution.

Examples of interface circuitry 115 include, but are not limited to, an input/output (I/O) subsystem, an I/O interface, a bus system, and a memory interface. For example, interface circuitry 115 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System 100 may optionally include one or more input/output (I/O) devices 120 coupled to interface circuitry 115. Examples of I/O devices 120 include, but are not limited to, a keyboard, a display device, a pointing device, a network adapter, one or more communication ports, etc. The I/O devices may be coupled to system 100 directly or through intervening I/O controllers. A network adapter enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

Memory 110 stores one or more program modules. Examples of program modules include, but are not limited to, routines, programs, objects, components, logic, and other types of data structures. In the example of FIG. 1, memory 110 stores an operating system 125, an electronic design automation (EDA) application 130, a SAT router 135, and a circuit design 155.

EDA application 130 is capable of performing operations such as synthesis, placement, routing, bitstream generation, and so forth on circuit design 155. Circuit design 155, for example, may be specified using a hardware description language (HDL), as a netlist, or as another type of data structure.

SAT router 135 is executable by processor 105. SAT router 135 is capable of determining whether a solution exists for a routing problem such as determining routes for data flows specified in circuit design 155. While SAT router 135 is illustrated as an independent application, in another aspect, SAT router 135 may be integrated with EDA application 130. In an embodiment, SAT router 135 includes a SAT encoder 140 that is capable of encoding the routing problem of circuit design 155 into an expression 145. SAT router 135 further may include a SAT solver 150.

Expression 145 includes a plurality of variables representing data flows, routing constraints, and the QOS parameters. In one or more embodiments, expression 145 is a Boolean formula. A Boolean variable is a variable that can take on the value of either true or false. A Boolean formula is constructed from Boolean variables and various Boolean operators. Examples of Boolean operators include, but are not limited to, the unary operator NOT (negation, also denoted by an overline such as $\bar{1}$), and the binary operators AND (conjunction, also denoted by $\wedge$), OR (disjunction, also denoted by $\vee$), and IMP (implication, also denoted by =>). In illustration, $(x_1 \vee \overline{x_2}) \Rightarrow (x_3 \wedge \overline{(x_1 \vee x_4)})$ is an example of a Boolean formula over the Boolean variables $\{x_1, x_2, x_3, x_4\}$.

A literal refers to an atomic Boolean formula which is either a Boolean variable or the negation of the Boolean variable. For example, $x_i$ and $\overline{x_i}$ are literals. A clause is a Boolean formula which is a disjunction of literals. For example, $(x_1 \vee \overline{x_2} \vee x_3)$ is a clause containing 3 literals.

A Conjunctive Normal Form (CNF) is a Boolean formula which is a conjunction of clauses. For example, $(x_1 \vee \overline{x_2} \vee x_3) \wedge (\overline{x_1} \vee x_4) \wedge \overline{x_4}$ is a CNF with 3 clauses. In practice, CNFs may be expressed as a list of clauses. For example, the CNF of $(x_1 \vee \overline{x_2} \vee x_3) \wedge (\overline{x_1} \vee x_4) \wedge \overline{x_4}$ can be expressed as:

$x_1 \vee \overline{x_2} \vee x_3$
$\overline{x_1} \vee x_4$
$\overline{x_4}$

SAT encoder 140, as executed by system 100, is capable of generating expression 145. Expression 145 can include one or more constraints and/or Boolean variables. In one aspect, expression 145 is a CNF. Expression 145 defines the problem of routing data flows of circuit design 155 to be solved by SAT solver 150. In one or more embodiments, SAT encoder 140 performs a SAT encoding process to generate expression 145 and/or assumptions defined as literals.

In general, the constraints are, or include, routing constraints or a conjunction of routing constraints, that represent legal routes of source-sink pairs (e.g., master circuits and slave circuits) to be routed. Examples of different types of constraints include, but are not limited to, conductive constraints, QOS constraints (e.g., physical capacity constraints and latency constraints), virtual channel constraints, deadlock avoidance constraints, and directionality constraints.

In one or more embodiments, SAT encoder 140 creates a variable for each source-sink pair of the routing problem. The variable may be a Boolean variable. The value of the Boolean variable encodes the existence of a path between the source and the sink in the routing solution. The source-sink variables are used as assumptions that are passed to SAT solver 150. Further aspects of SAT encoding processes are discussed in greater detail below in connection with FIGS. 5, 6, and 7. System 100 is capable of defining variables, e.g., Boolean variables, and the corresponding semantic for each variable.

In one or more embodiments, SAT solver 150 is implemented as an engine capable of either finding a variable assignment that satisfies expression 145 and any assumptions passed thereto or proving that no variable assignment exists that satisfies expression 145 and any assumptions. SAT solver 150 utilizes an exhaustive approach to explore the entire search space. Thus, SAT router 135 is capable of determining a routing solution for a plurality of data flows specified by circuit design 155.

The data flows, which are described herein in greater detail, specify communication between two nodes (e.g., a master circuit and a slave circuit) in circuit design 155 and are designated therein to be routed using a programmable NOC. In an embodiment, a data flow is a transaction. A transaction refers to an indivisible operation within a communication network or communication protocol that either succeeds or fails as a complete unit. As an illustrative example, a data flow may be a read request, a write request, a read response, or a write response. The examples provided are only intended for purposes of illustration and, as such, are not intended to limit the example embodiments described herein in any way.

A variable assignment refers to the association of a value to all of the variables of expression 145. In the case of a Boolean expression, a variable assignment refers to the association of a value such as "true" or "false" to all the Boolean variables. For example, given a Boolean formula f and a variable assignment, SAT router 135 is capable of determining a Boolean value for f by traversing the formula f bottom-up and attaching a Boolean value to each of the intermediate nodes of the formula f. A Boolean formula f is said to be "satisfiable" if there exists at least one assignment of the variables of f that evaluates to "true" for the Boolean formula overall. In particular, a CNF is satisfiable if and only if there is an assignment of variables of the CFN for which each clause contains at least one literal with the value true. For example, the variable assignment of Example 1 satisfies the CNF $(x_1 \vee \overline{x_2} \vee x_3) \wedge (\overline{x_1} \vee x_4) \wedge \overline{x_4}$ because the literal $x_3$ has the value "true" in the first clause, the literal $\overline{x_1}$ has the value "true" in the second clause, and the literal $\overline{x_4}$ has the value "true" in the third clause.

| Example 1 |
|---|
| $x_1$ = false |
| $x_2$ = true |
| $x_3$ = true |
| $x_4$ = false |

In contrast, the variable assignment illustrated in Example 2 does not satisfy the CNF of $(x_1 \vee \overline{x_2} \vee x_3) \wedge (\overline{x_1} \vee x_4) \wedge \overline{x_4}$ since none of the literals of the clause $(\overline{x_1} \vee x_4)$ have the value "true."

| Example 2 |
|---|
| $x_1$ = true |
| $x_2$ = true |
| $x_3$ = true |
| $x_4$ = false |

SAT solver 150 is capable of receiving inputs in the form of expression 145, e.g., a Boolean formula as a CNF, and a set of one or more assumptions. The assumptions are literals assumed to have a true value. SAT solver 150 is called to find a solution for expression 145. Accordingly, SAT solver 150 either returns a solution that satisfies expression 145 or returns a set of assumptions that make expression 145 unsatisfiable.

In one aspect, operating system 125 and EDA application 130 (and/or SAT router 135), being implemented in the form of executable program code, are executed by system 100 and, more particularly, by processor 105, to perform the operations described within this disclosure. As such, operating system 125, EDA application 130, and SAT router 135 may be considered an integrated part of system 100. Any data used, generated, and/or operated upon by system 100 are functional data structures that impart functionality when employed as part of system 100.

System 100 may include fewer components than shown or additional components not illustrated in FIG. 1 depending upon the particular type of device that is implemented. In addition, the particular operating system and/or application(s) included may vary according to device type as may the types of network adapter(s) included. Further, one or more of the illustrative components may be incorporated into, or otherwise form a portion of, another component. For example, a processor may include at least some memory.

Figure 2:
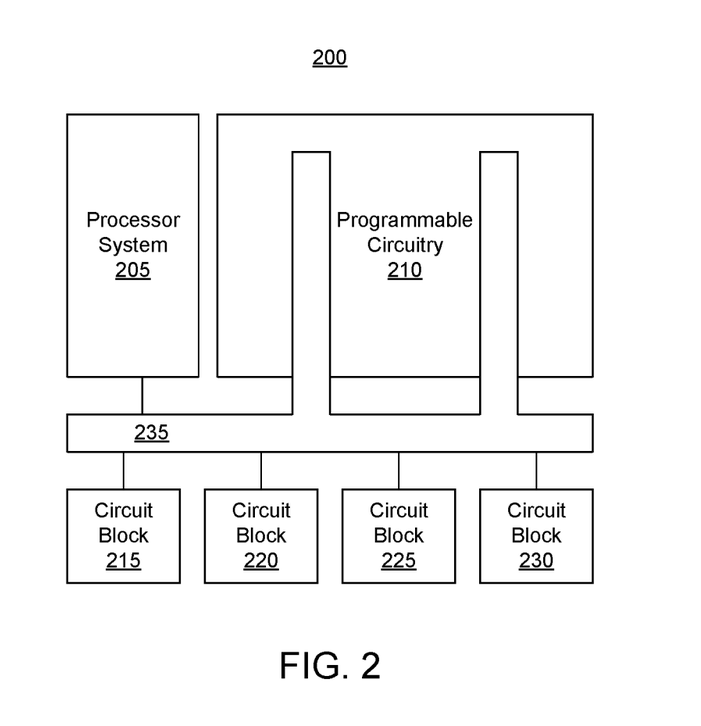
FIG. 2 illustrates an example of an integrated circuit (IC) having a programmable network-on-chip (NOC).

FIG. 2 illustrates an example of an IC 200 having a programmable NOC. IC 200 is illustrative of an architecture of a target IC in which a circuit design such as circuit design 155 is implemented. As shown, IC 200 includes a processor system 205, programmable circuitry 210, circuit blocks 215, 220, 225, and 230, and a NOC 235. In the example of FIG. 2, NOC 235 is a programmable NOC.

Processor system 205 is implemented as a hardware circuit that is configured to execute program code. In an aspect, processor system 205 is implemented as dedicated or hardwired circuitry that is fabricated as part of the die that implements IC 200. Processor system 205 may be implemented as any of a variety of different processor types and/or systems ranging in complexity from an individual processor, e.g., a single core capable of executing program code, to an entire processor system having one or more cores, modules, co-processors, interfaces, or the like. In another aspect, processor system 205 is implemented using programmable circuit blocks of IC 200 by way of loading configuration data into IC 200.

Programmable circuitry 210 includes a plurality of programmable circuit blocks. The programmable circuit blocks implementing programmable circuitry 210 are generally arranged in an array. In an embodiment, programmable circuitry 210 is field programmable gate array (FPGA) circuitry. Examples of programmable blocks included in programmable circuitry 210 include, but are not limited to, configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into IC 200 by an external device. The collective states of the individual memory cells then determine the function of the programmable circuitry and/or other circuit blocks of IC 200. The configuration memory cells may control operating modes of processor system 205 and/or circuit blocks 215-230.

Circuit blocks 215-230 represent hardwired and/or dedicated circuit blocks. Circuit blocks 215-230 may be user configurable. Examples of hardwired circuit blocks can include, but are not limited to, IC management resources, random access memory (RAM) such as double data rate (DDR) memory, a memory controller, high bandwidth (HBM) memory, video converter circuit blocks, and so forth. Examples of user configurable hardwired circuit blocks can include but are not limited to, transceivers, input/output (I/O) circuit blocks, other user defined I/O interfaces, and so forth.

NOC 235 is a packet switched network that couples processor system 205, programmable circuitry 210 (e.g., user specified circuits implemented within programmable circuitry 210), and circuit blocks 215-230. NOC 235 is implemented as a programmable NOC. As such, NOC 235 may include various components such as switches and arbitration circuits that are programmed by loading NOC configuration data into IC 200. NOC configuration data, for example, is generated by routing data flows for implementation within NOC 235. Because NOC 235 is programmable, route assignments for NOC 235 may be configured, e.g., programmed, at boot-time of IC 200 and/or during run-time of IC 200. That is, route assignments for NOC 235 may be changed dynamically during operation of IC 200. A route assignment or route, for example, defines the switches through which a data flow passes and the virtual channel assigned to the data flow.

In one or more embodiments, NOC 235 is programmed independently of the other portions of IC 200. The NOC configuration data, for example, is independent of configuration data used to program other portions of IC 200 thereby allowing routes (e.g., routing assignments) for data paths within NOC 235 to be changed dynamically during runtime of IC 200 independently of whether other circuitry, e.g., programmable circuitry 210 and/or circuit blocks 215-230, are reconfigured.

As pictured, NOC 235 serves as an on-chip interconnect between the various hardwired circuit resources of IC 200 (e.g., circuit blocks 215-230 and/or processor system 205), programmable circuitry 210, and/or different combinations thereof. For example, NOC 235 is capable of routing data paths between various combinations of master circuits and slave circuits whether the master-slave circuits are both implemented as hardwired circuits, as a hardwired circuit and a circuit implemented in programmable circuitry, or are both circuits implemented in programmable circuitry. As such, route assignments implemented in NOC 235 are undetermined until such time that a user circuit design is specified that defines the various circuits to be implemented within programmable circuitry 210 and which of the circuits are to communicate with other circuits of programmable circuitry 210, circuit blocks 215-230, and/or processor system 205.

For example, while one or more portions of a circuit design may require synthesis, placement, and/or routing for implementation within IC 200 (e.g., programmable circuitry 210), data flows designated for implementation using NOC 235 undergo another routing process that is specific to NOC 235. Each data path implemented in NOC 235 defines communication between a master circuit and a slave circuit. In an embodiment, a system, such as system 100 described in connection with FIG. 1, is capable of determining a routing solution for NOC 235.

It should be appreciated that IC 200 is provided for purposes of illustration and not limitation. An IC including a programmable NOC may include more circuit blocks than shown, fewer circuit blocks than shown, different varieties of circuit blocks, and/or different combinations of circuit blocks. For example, some ICs having a programmable NOC may not include a processor system.

Figure 3:
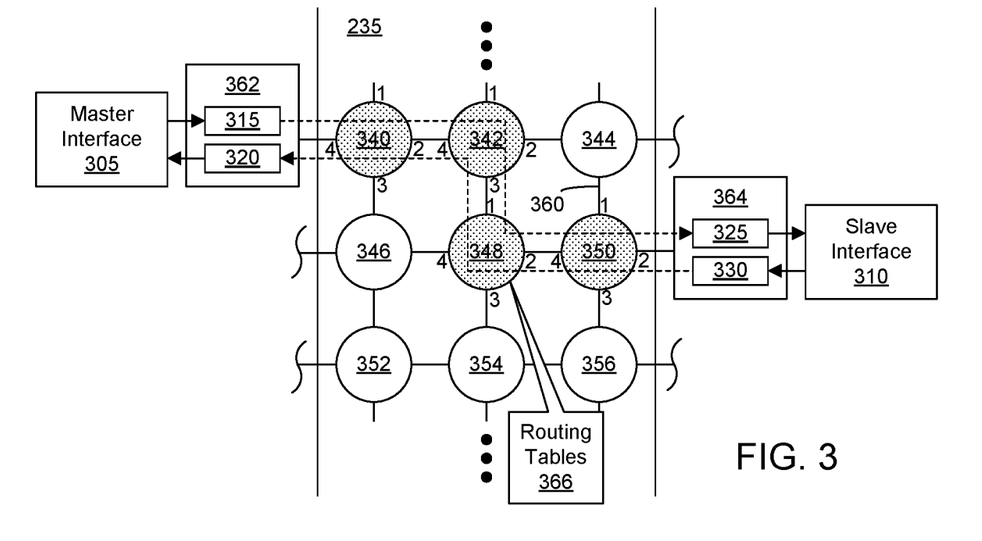
FIG. 3 illustrates an example route assignment for a data flow between a master circuit and a slave circuit through a programmable NOC.

FIG. 3 illustrates an example route assignment (e.g., a route) for a data flow between a master circuit and a slave circuit through NOC 235. FIG. 3 also illustrates aspects of NOC 235 in greater detail. As pictured, a master interface 305 couples to NOC 235 through a NOC control circuit 362. In an aspect, NOC control circuit 362 includes buffers 315 and 320. Buffer 315 conveys data from master interface 305 into NOC 235, while buffer 320 conveys data received from NOC 235 to master interface 305. Master interface 305 is coupled to a master circuit (not shown) for the data flow illustrated. Similarly, slave interface 310 couples to NOC 235 through NOC control circuit 364. In an aspect, NOC control circuit 364 includes buffers 325 and 330. Buffer 325 conveys data from NOC 235 to slave interface 310. Buffer 330 conveys data from slave interface 310 to NOC 235. Slave interface 310 is coupled to a slave circuit (not shown) for the illustrated data flow. The master (slave) circuit may be implemented in programmable circuitry while the slave (master) circuit is implemented as a hardwired circuit block. In another aspect, both master and slave circuits may be implemented as hardwired circuit blocks. In still another aspect, both master and slave circuits may be implemented in programmable circuitry.

In one or more embodiments, NOC control circuit 362 and NOC control circuit 364 include additional circuitry not illustrated in FIG. 3. For example, NOC control circuits 362 and 364 each may include additional buffers and packet routing circuitry capable of receiving data streams or transactions (e.g., packetized data) and placing the data on a particular virtual channel selected from a plurality of different virtual channels available for routing the data. Virtual channels are described herein in greater detail in connection with FIG. 4.

The circuit design being implemented specifies that the master circuit and the slave circuit are coupled through a data flow. The data flow traverses through NOC 235. NOC 235 includes a plurality of switches 340-356. Switches 340-356 are interconnected. In the example of FIG. 3, switches are interconnected or coupled by channel circuitry 360. As illustrated in FIG. 3, NOC 235 may include additional switches (not shown). In the example of FIG. 3, the data flow traverses through NOC 235 using a path or route formed by switches 340, 342, 348, and 350. The routes are determined, at least in part, by loading NOC configuration data into IC 200 and/or programming NOC 235. In an aspect, the NOC configuration data includes the data used to program routing tables, e.g., routing tables 366, implemented within each of switches 340-356.

In general, each of switches 340-356 includes multiple input ports and multiple output ports. In the example of FIG. 3, each of switches 340-356 includes four input ports and four output ports (labeled 1-4 in FIG. 3 for each switch). Referring to switch 348 for purposes of illustration, switch 348 has an input port 1 coupled to switch 342, an input port 2 coupled to switch 350, an input port 3 coupled to switch 354, and an input port 4 coupled to switch 346. Similarly, switch 348 has an output port 1 coupled to switch 342, an output port 2 coupled to switch 350, an output port 3 coupled to switch 354, and an output port 4 coupled to switch 346. Routing tables 366 specify, for a given data flow or transaction received on an input port, which output port the data is to be output from the switch. To implement the route illustrated in FIG. 3, for example, routing tables 366 in switch 348 have an entry corresponding to the data flow routed as shown that specifies that the data is to be output on output port 2 coupled to switch 350.

In one or more embodiments, each of switches 340-356 includes multiple routing tables. For example, each of switches 340-356 includes one routing table for each different virtual channel that is implemented in NOC 235. As noted, virtual channels are described in greater detail in connection with FIG. 4.

Due to the structure of NOC 235, there are a variety of different ways to couple master interface 305 with slave interface 310 that each use a different combination of switches 340-356. A system as described herein, e.g., system 100 of FIG. 1, is capable of determining routes through a programmable NOC such as NOC 235 to implement data flows of a circuit design. The system determines the routes while observing QOS parameters established for the data flows and avoiding deadlock conditions.

Figure 4:
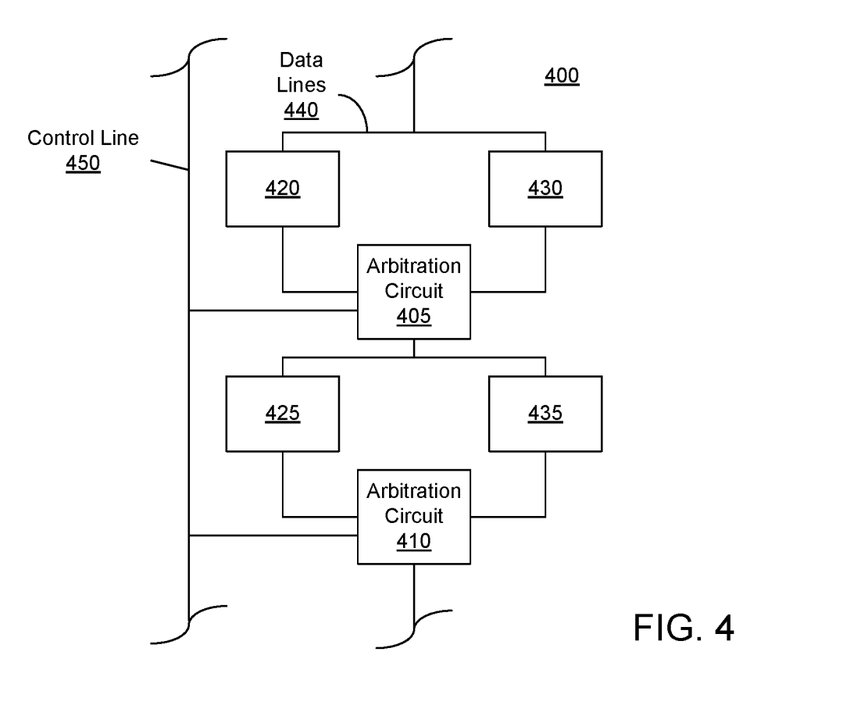
FIG. 4 illustrates an example of channel circuitry for a NOC.

FIG. 4 illustrates an example of channel circuitry 400 for a NOC. Channel circuitry 400 may be used to implement a unidirectional, physical connection between switches 340-356 in NOC 235. A bidirectional connection between switches in NOC 235 such as channel circuitry 360 of FIG. 3, for example, may be implemented using a first instance of channel circuitry 400 carrying data in a first direction and a second instance of channel circuitry 400 carrying data in the opposite direction. Channel circuitry 400 implements two or more virtual channels. As such, channel circuitry 360 of FIG. 3 can include two or more virtual channels in each direction.

In the example of FIG. 4, channel circuitry 400 implements two virtual channels. Virtual channels allow a single physical channel to carry data for more than one data flow concurrently. As pictured, channel circuitry 400 includes arbitration circuits 405 and 410. Further, channel circuitry 400 includes a first virtual channel formed of buffers 420 and 425 and a second virtual channel formed of buffers 430 and 435. Data lines 440 carry data through buffers 420, 425, 430, and/or 435. Arbitration circuits 405 and 410 determine which data from buffers 420, 425, 430, and 435 are allowed to propagate through channel circuitry 400 at any given time.

Control line 450 conveys control signals for virtual channel 1 and for virtual channel 2. For example, control line 450 conveys control signals between master interface 305 and slave interface 310. In an embodiment, control line 450 conveys control signals between different pairs of master-slave circuits coupled to master interface 305 and slave interface 310. In another embodiment, control line 450 conveys control signals between a first pair of master-slave circuits coupled to master interface 305 and slave interface 310 and also conveys controls signals between a different pair of master-slave circuits coupled to master interface 305 and slave interface 310. In either case, each virtual channel carries a different data flow.

Control line 450 may run from switch to switch. Control line 450 further may convey a multi-bit control signal. In the example of FIG. 4, control line 450 is coupled to arbitration circuits 405 and 410 to control operation thereof. In one or more embodiments, control line 450 is daisy chained from a switch (not shown) below arbitration circuit 410 to arbitration circuit 410, then to arbitration circuit 405, and then to a switch (not shown) above arbitration circuit 405.

In the example of FIG. 4, two different data flows are using channel circuitry 400. The two data flows have different priorities and are assigned to different virtual channels. For example, data flow 1 is assigned to virtual channel 1 (buffers 420 and 425). Data flow 1 has a higher priority than data flow 2. Data flow 2 is assigned to virtual channel 2 (buffers 430 and 435). Accordingly, data for data flow 1 propagates through virtual channel 1 using buffers 420 and 425. Data for data flow 2 propagates through virtual channel 2 using buffers 430 and 435. Using virtual channel circuitry 400 allows higher priority data to pass by lower priority data on the same physical channel circuitry.

As an illustrative example, arbitration circuits 405 and 410 may be controlled by control line 450 to allow data for data flow 1 to propagate through channel circuitry 400 while temporarily halting data for data flow 2. Thus, arbitration circuit 405 allows data for data flow 1 to propagate from buffer 420 to buffer 425. Arbitration circuit 410 allows data from data flow 1 to propagate from buffer 425 to a next node. Concurrently, arbitration circuit 405 prevents data for data flow 2 from propagating from buffer 430 to buffer 435. Similarly, arbitration circuit 410 prevents data for data flow 2 from propagating from buffer 435 to a next node. Control line 450 are capable of transmitting data stall signals as appropriate. As such, channel circuitry 360 allows data for data flow 1 to overtake and pass data for data flow 2 despite the two data flows using the same physical channel circuitry between switches. By using channel circuitry as described in connection with FIG. 4, different data flows may utilize the same physical channel through NOC 235 without having lower priority data delay or obstruct higher priority data.

In one or more embodiments, the NOC configuration data described herein also includes the data used to program arbitration circuits such as arbitration circuits 405 and 410 for the various channel circuits included within the NOC.

In FIG. 4, channel circuitry 400 is shown to include two virtual channels. It should be appreciated that FIG. 4 is provided for purposes of illustration and not limitation. As such, channel circuitry 400 may include more than two virtual channels. For example, channel circuitry 400 may support 2, 4, 8, 16, etc., virtual channels. Such implementations would require additional buffers. Further, control signals may be implemented on a per-virtual channel basis. Also, as noted, each switch may include one routing table for each virtual channel.

Referring to both FIGS. 3 and 4, master interface 305 may receive a transaction from a circuit. The transaction may specify a transaction identifier (ID), a source ID, and a destination ID. In this example, the source ID may specify master interface 305 and the destination ID may specify slave interface 310. NOC control circuit 362 is capable of receiving the transaction and placing the transaction on an appropriate virtual channel. In one or more embodiments, NOC control circuit 362 is capable of placing the transaction on a particular virtual channel based upon the transaction ID, the source ID, and/or the destination ID included in the transaction.

Switch 340 obtains the transaction from NOC control circuit 362. In an example, each virtual channel may be assigned its own buffer within NOC control circuit 362. Thus, switch 340 is aware of the particular virtual channel to which the transaction is assigned at least by virtue of the buffer in NOC control circuit 362 from which the data is read or otherwise obtained.

Switch 340 can include one or more routing tables. In this example, having determined the virtual channel for the transaction, e.g., virtual channel 1, switch 340 determines the routing table for virtual channel 1. Switch 340 locates an entry in the routing table using the destination ID specifying slave interface 310. The located entry specifies the particular output port of switch 340 over which the transaction is to be sent. In this example, the routing table indicates that output port 2, which is coupled to switch 342, is to be used. Switch 340 outputs the transaction on output port 2 on the same virtual channel as the transaction was received, which is virtual channel 1 in this example.

Each of switches 342, 348, and 350 is capable of performing a same/similar process as switch 340. Each of switches 342, 348, and 350, for example, is aware of the particular virtual channel over which data is received. Each virtual channel looks up the destination ID within the routing table for virtual channel 1 (in this example), determines the output port, and outputs the transaction on the determined output port on the same virtual channel. For example, switch 342 determines that the data is to be output through virtual channel 1 of output port 3 to switch 348. Switch 348 determines that the data is to be output through virtual channel 1 of output port 2 to switch 350. Switch 350 determines that the data is to be output through virtual channel 1 of output port 2 to NOC control circuit 364 and to slave interface 310.

As discussed, the transaction may specify the source ID and the destination ID. Slave interface 310 is capable of sending a response back to master interface 305 (e.g., when a response is received). In this example, the source ID of the earlier transaction may be used as the destination ID for sending the response. Accordingly, the response may traverse back through NOC 230 through NOC control unit 364, which places the response on the appropriate virtual channel, to switch 350, to switch 348, to switch 342, to switch 340, and on to NOC control circuit 362 and to master interface 305. Switches 350, 348, 342, and 340 perform lookup operations using the appropriate routing table selected based upon virtual channel and determine the output port over which the response is to be sent based upon the destination ID (previously the source ID).

Figure 5:
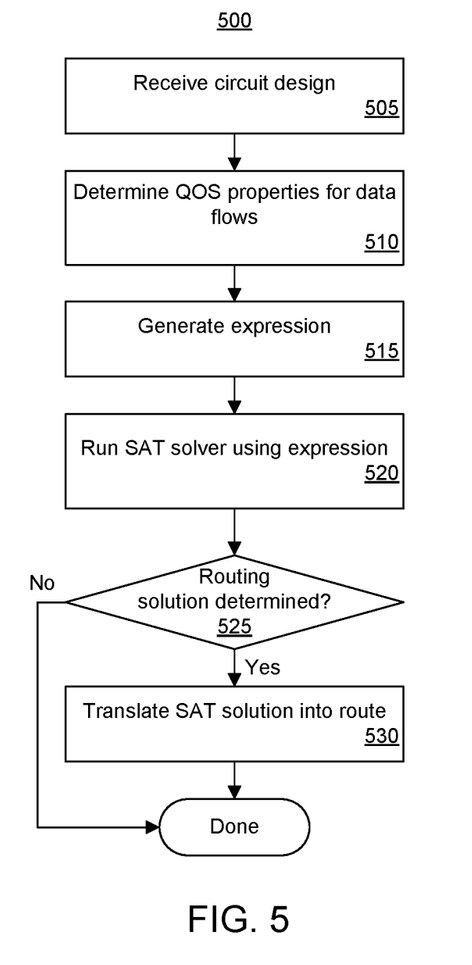
FIG. 5 illustrates an example method of routing a circuit design for implementation using a programmable NOC.

FIG. 5 illustrates an example method 500 of routing a circuit design for implementation using a programmable NOC. Example method 500 illustrates the determination of route assignments for data flows of a circuit design carried through a programmable NOC. Method 500 may be performed by a system the same as, or similar to, the system described in connection with FIG. 1. It should be appreciated that the system may be implemented as a single computing system or as two or more networked and/or distributed computing systems.

In block 505, the system receives a circuit design. The circuit design specifies a routing problem in terms of one or more data flows that are designated for implementation within a programmable NOC of a target IC. In block 510, the system determines QOS properties for the data flows. The QOS properties may be specified in a file that is separate from the circuit design or within the circuit design itself. The QOS properties may be specified by a designer, e.g., a user. The QOS properties may be specified on a per-data flow basis. The system is capable of reading or obtaining the QOS properties from a data source, e.g., the circuit design, other file or data structure, for the data flows. The system is capable of correlating or assigning the QOS properties with the data flows for purposes of generating an expression. In solving the routing problem, the system determines a routing solution that complies with the QOS properties of the data flows.

An example of a QOS property of a data flow is bandwidth. The bandwidth may be specified in any of a variety of formats such as bits per unit time, bytes per unit time, etc. Bandwidth specifies an amount of data that is carried by the data flow. Another example of a QOS property of a data flow is traffic class. Traffic class specifies latency requirements for the data flow. Examples of traffic class can include, but are not limited to, "low latency," "isochronous," and "best effort." The "low latency" property value indicates that the data flow, as implemented in the programmable NOC, should have the lowest latency available. The data flow, for example, is given higher priority than data flows with the "isochronous" or "best effort" traffic class to achieve the lower latency through the programmable NOC. The "isochronous" property value indicates that the latency of the data flow, as implemented within the programmable NOC, is not to exceed an upper limit. The upper limit may be specified on a per-data flow basis or as a threshold to be observed for any data flow of the circuit design designated as "isochronous." The "best effort" property value indicates that the latency of the data flow, as implemented within the programmable NOC, is open and may be as good or as poor as what is available. For example, a data flow with a "best effort" traffic class may have a latency that exceeds an upper limit. A data flow assigned a "best effort" traffic class will have higher latency than a data flow assigned a "low latency" or an "isochronous" traffic class.

Another example of a QOS property of a data flow is a communication type. Example communication types can include, but are not limited to, "read request," "read response," "write request," and "write response." Another example of a QOS property of a data flow is a maximal latency. Maximal latency specifies a maximum latency value for a data path, as implemented within the programmable NOC. In an aspect, the maximal latency property may be used as the upper limit for the "isochronous" traffic class property value.

In block 515, the system generates an expression. In an embodiment, the system, e.g., the SAT encoder, generates a Boolean formula as the expression representing the routing problem to be solved. The Boolean formula may be a CNF formula. The expression defines the problem of routing data flows of the circuit design to be solved using the SAT solver. For example, the system generates a Boolean formula having a plurality of Boolean variables representing the data flows, routing constraints, and the QOS parameters. The system, in executing the SAT solver, is capable of receiving the expression as input and returning either an assignment of the variables of the expression that is true, or a proof that the expression is unsatisfiable.

In block 520, the system runs the SAT solver using the expression. As discussed, the SAT solver executes and attempts to determine a routing solution by finding an assignment of variables in which the expression evaluates to true.

In block 525, the system determines whether a routing solution to the routing problem is found. For example, the system determines that a solution to the routing problem is found in response to determining an assignment for the variables in which the expression generated in block 515 evaluates to true. The system determines that a solution was not found in response to determining that no assignment for the variables results in the expression generated in block 515 evaluating to true. In response to execution of the SAT solver finding a solution to the routing problem, method 500 continues to block 530. In response to the SAT solver being unable to find a solution to the routing problem, method 500 ends.

In block 530, the system is capable of translating the SAT solution into a routing solution for the data flows of the circuit design. The SAT solution, for example, specifies physical paths, e.g., the set of switches through the programmable NOC, for each data path. The SAT solution further assigns a virtual channel to each data path. In determining a routing solution, the system effectively takes user specified data flows and QOS properties of the data flows and maps the data flows onto the programmable NOC. In addition, the routing solution is deadlock free. A deadlock free routing solution is one where there are not channel dependency cycles.

In one or more embodiments, the system is capable of performing an iterative process in cases where no solution is found. For example, the system is capable of relaxing one or more constraints, generating a new expression with the relaxed constraints, and performing block 520. The system is capable of iteratively performing these operations where the constraints are further relaxed each iteration to find a routing solution. Further details relating to relaxation of constraints and the iterative process performed by the system are described in greater detail in connection with FIG. 6.

In an aspect, translating the SAT solution into a routing solution includes generating the NOC configuration data. The NOC configuration data may include data used to program the routing tables of the switches in the programmable NOC (e.g., the entries as described). The NOC configuration data may include data for configuring NOC control circuits to place transactions on the appropriate virtual channels. The NOC configuration data may also include data used to program the arbitration circuits or the switches to control the arbitration circuits.

An IC including a programmable NOC as described herein may undergo a boot or startup process. In one or more embodiments, the NOC may be initially configured using a default NOC configuration as part of the boot or startup process. Once the IC is booted, user circuit designs may be loaded or implemented in the IC. For example, though a user circuit design may not be loaded into the IC until after the boot process has finished, the programmable NOC may be initially configured as part of the boot process to establish at least some default routes. The default NOC configuration allows some components of the IC to communicate. For example, after the boot process has finished and the default NOC configuration is loaded (but prior to loading a user circuit design or NOC configuration for the user circuit design), the processor is able to communicate with RAM, a memory controller, or other circuit blocks through the programmable NOC using the default routes.

In response to booting the IC, or thereafter, the programmable NOC may be configured by loading NOC configuration data for a user circuit design. For example, in response to booting the IC, the user circuit design and the NOC configuration data for the user circuit design may be loaded into the IC. The NOC configuration data for the user circuit design implements further routes as described herein for the user circuit design also implemented in the IC. In some cases, the NOC configuration data for the user circuit design may remove and/or replace one or more or all of the default routes.

Further, it should be appreciated that some portion of the programmable NOC or the entire programmable NOC may be again reconfigured after loading the NOC configuration data for the user circuit design to change one or more or all of the routes implemented by the programmable NOC. In this regard, the programmable NOC may be configurable dynamically during runtime (e.g., operation) of the IC. For example, some portion or all of the programmable NOC may be modified to implement different routes to support a partial reconfiguration of the IC wherein some, but not all of the programmable circuitry is modified.

Figure 6:
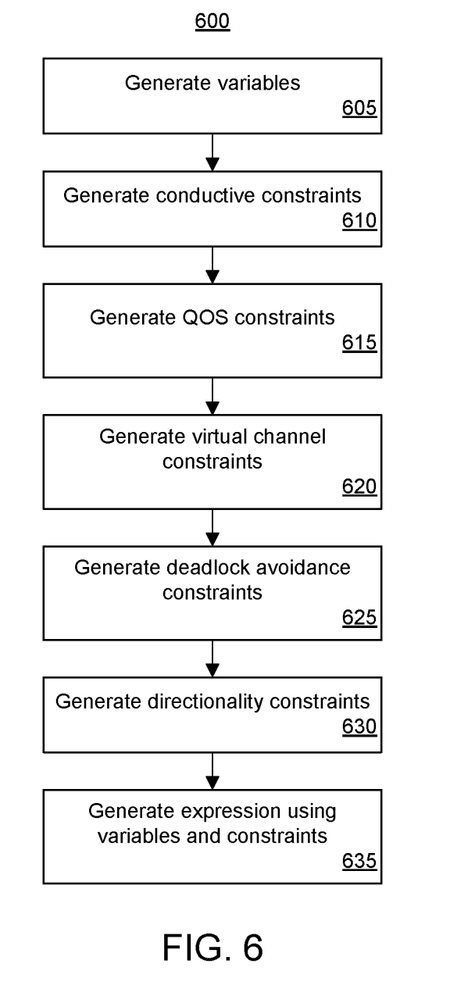
FIG. 6 illustrates an example method of generating a Boolean formula.

FIG. 6 illustrates an example method 600 of generating a Boolean formula as performed in block 515 of FIG. 5. In block 605, the system generates variables. In an embodiment, the system generates Boolean variables for each data flow of the form Flow(f, n), where f is a data flow and n is a node (e.g., a switch) of the programmable NOC. The Boolean variable Flow(f, n) is true if the data flow f goes through node n.

In blocks 610-630, the system generates various types of routing constraints. In block 610, for example, the system generates conductive constraints. A conductive constraint enforces the existence of a conductive path from a source to a sink. The system is capable of generating a conductive constraint for each data flow that is to be routed.

In block 615, the system generates QOS constraints. In one or more embodiments, the QOS constraints include physical capacity constraints. Physical capacity constraints specify that the total bandwidth of data flows going through a node (e.g., a switch) of the programmable NOC cannot exceed the capacity of the node. As discussed, each data flow has a bandwidth QOS property assigned thereto. The SAT solver ensures that, for each node of the programmable NOC, the sum of the bandwidths of data flows assigned to the node (e.g., the data flows traversing through the node) is less than or equal to the capacity of the node.

As an illustrative example, each data flow may be assigned an integer bandwidth of 1 as a default. Each node of the routing graph, e.g., each port of a switch, may also have a capacity of 1 as a default. In an embodiment, the capacity constraints generated by the system are expressed as threshold constraints over Boolean variables. For example, the system can generate capacity constraints formally defined as $\Sigma_f BW(f)*Flow(f, n) \leq Cap(n)$ within a Boolean formula (e.g., the expression), where $BW(f)$ is the bandwidth of the data flow f, and $Cap(n)$ is the capacity of the node n.

Referring to FIG. 3 for purposes of illustration, more than one data flow may be routed through a particular switch. For example, 2, 3, or more data flows may be routed through switch 348. The physical capacity constraint ensures that the sum of the bandwidths of the data flows routed through switch 348 do not exceed the physical capacity of switch 348, e.g., the bandwidth of switch 348.

In one or more embodiments, the QOS constraints include latency constraints (e.g., enforcing the maximal latency QOS property for data flows). A latency constraint for a data flow having a "low latency" type of traffic class, for example, ensures that the latency of the data flow, as routed through the switches of the NOC, does not exceed a maximal latency specified for the data flow.

In one or more embodiments, the QOS constraints include bandwidth constraints. A bandwidth constraint for a data flow having an "isochronous" type of traffic class, for example, may be specified as a particular bandwidth for the data flow as described herein (e.g., as $BW(f)$). In the case of data flows of the traffic class "isochronous," the bandwidth of the data flows is not relaxed despite the potential iteration of the processes described herein.

In one or more embodiments, bandwidth constraints and latency constraints may be relaxed for data flows with a "best effort" type of traffic class. For example, in cases where no solution is found in reference to block 525, the system is capable of performing an iterative approach where the bandwidth constraints and/or the latency constraints of data flows having the "best effort" type of traffic class are relaxed, the expression is regenerated using the relaxed constraints, and block 520 is performed. The system is capable of iteratively performing these operations where the constraints are further relaxed each iteration to find a routing solution. In particular embodiments, the system does not generate latency constraints (e.g., maximal latency) for data flows with a "best effort" type of traffic class.

In one or more embodiments, the QOS constraints include a constraint that restricts two data flows having different QOS parameters from using a same virtual channel. As an illustrative and non-limiting example, for each pair of data flows f1, f2, having different QOS parameters and for each virtual channel k, the system is capable of generating a constraint such as $VC(f1, k)+VC(f2, k) \leq 1$.

In block 620, the system generates virtual channel constraints. A virtual channel constraint is typically represented as a Boolean formula describing which virtual channels can be used by each data flow. The virtual channel constraint (e.g., a Boolean formula) contains Boolean variables specifying the basic relationship between data flows and virtual channels.

For example, a Boolean variable $VC(f, k)$ can be used for each flow f and virtual channel k to indicate whether the flow f uses the virtual channel k. In an embodiment, a semantic for $VC(f, k)$ is that $VC(f, k)$ takes on the value of true if and only if the flow f uses the virtual channel k. In an example, the virtual channels can be specified using integers. For example, in a programmable NOC that includes 8 virtual channels, each virtual channel can be specified by an integer k such that k<8.

Further, it should be appreciated that the total number of virtual channels are divided between the two directions supported by the channel circuitry. For example, in the case where k<8, virtual channels 0-3 are in a first direction, while virtual channels 4-7 are in the opposite direction.

In an embodiment, virtual channel constraints specify that each data flow must use one and only one virtual channel. The system is capable of generating virtual channel constraints to enforce this condition as $$\sum_{k=0}^{7} VC(f, k) = 1.$$

The virtual channel constraints also specify that each data flow must use one of the virtual channels assigned to the data flow.

In another embodiment, data flows belonging to a same group must use a compatible virtual channel. Data flows can be assigned to groups based upon data flow type. For example, read requests may be assigned to a first group, read responses to a second group, write requests to a third group, and write responses to a fourth group. Each group may be assigned to a particular virtual channel said to be compatible with that group. For example, with four virtual channels, read requests may be assigned to virtual channel 0, read responses may be assigned to virtual channel 1, write requests may be assigned to virtual channel 2, and write responses may be assigned to virtual channel 3. A given virtual channel carries only data flows of one type.

In the case where there are more virtual channels than data flow types, a data flow type can be assigned to more than one virtual channel. For example, with eight virtual channels, read requests may be assigned to virtual channels 0 and 4, read responses to virtual channels 1 and 5, write requests to virtual channels 2 and 6, and write responses to virtual channels 3 and 7. In an aspect, the system ensures that each group of data flows has a same number of compatible virtual channels, e.g., two in this example.

An example of virtual channel constraints that enforce usage of compatible virtual channels is shown below. In the example below, RReq stands for read request, RRsp stands for read response, WReq stands for write request, and WRsp stands for write response.

$$VC(f_{RReq}, 0) \lor VC(f_{RReq}, 4)$$

-continued $$VC(f_{RReq}, 0) \Leftrightarrow VC(f_{WReq}, 1) \Leftrightarrow VC(f_{RRsp}, 2) \Leftrightarrow VC(f_{WRsp}, 3)$$

$$VC(f_{RReq}, 4) \Leftrightarrow VC(f_{WReq}, 5) \Leftrightarrow VC(f_{RRsp}, 6) \Leftrightarrow VC(f_{WRsp}, 7)$$

As discussed, the assignment of groups of data flows to compatible virtual channels is optional. In one or more other embodiments, the system is capable of generating virtual channel constraints to specify that each data flow must use one and only one virtual channel and that each data flow must use one of the virtual channels assigned to the data flow without encoding the assignment of groups of data flows to compatible virtual channels.

In block 625, the system generates deadlock avoidance constraints. Deadlock avoidance constraints enforce the acyclicity of a companion graph that may be generated for each virtual channel.

Figure 7:
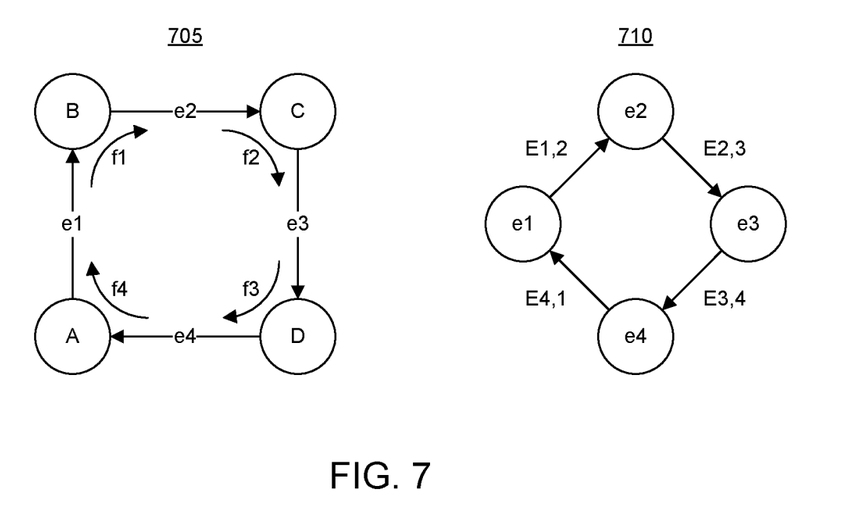
FIG. 7 illustrates an example of detecting deadlock conditions.

Deadlock avoidance is illustrated with reference to FIG. 7. FIG. 7 illustrates an example of deadlock detection. The example of FIG. 7 shows a routing graph 705 representing a portion of a programmable NOC and a companion graph 710. Graphs 705 and 710 are generated by the system and stored in memory as data structures. In one or more embodiments, routing graph 705 is generated as part of generating the expression in block 515.

As pictured, graph 705 has nodes A, B, C, and D, each representing a switch of a programmable NOC. Nodes A, B, C, and D are connected by edges e1, e2, e3, and e4. In this example, each of edges e1, e2, e3, and e4 corresponds to the same virtual channel. As described with reference to FIG. 4, nodes may be connected by a plurality of virtual channels. Routing graph 705 further illustrates route assignments for data flows f1, f2, f3, and f4. Routing graph 705 shows that data flow f1 traverses from node A, through edge e1, through node B, through edge e2, to node C. Data flow f2 traverses from node B, through edge e2, through node C, through edge e3, to node D. Data flow f3 traverses from node C, through edge e3, through node D, through edge e4, to node A. Data flow f4 traverses from node D, through edge e4, through node A, through edge e1, to node B.

The system generates companion graph 710 from routing graph 705 to reflect particular route assignments. In one or more embodiments, graph 710 is generated as part of block 625 of FIG. 6. A deadlock condition may occur when companion graph 710 includes one or more cycles. If companion graph 710 is cycle free, the routing solution is deadlock free. In companion graph 710, the nodes correspond to the edges of routing graph 705 that are used by at least one flow. The edges of companion graph 710 correspond to the edge pairs of routing graph 705 that are connected by a node and that are used by the same flow.

Companion graph 710 illustrates the following relationships:

f1: A→B→C edges: e1, e2=>1 edge E1,2
f2: B→C→D edges: e2, e3=>1 edge E2,3
f3: C→D→A edges: e3, e4=>1 edge E3,4
f4: D→A→B edges e4, e1=>1 edge E4,1

In an embodiment, the system uses the following theorem: Given graph G with N nodes, graph G has no cycle if and only if nodes of graph G can be labeled with integers 0, . . . , N−1 such that for every edge e of graph G, label(source (e))<label(target(e)). The system is capable of encoding the theorem as SAT constraints that prevent the SAT router from finding solutions with deadlocks.

In an example, the system encodes, using variables (e.g., Boolean variables), an index for each edge of routing graph 705. The edges, as noted, correspond to nodes of companion graph 710. The system ensures that if an edge E is created in companion graph 710 corresponding to the pair of edges (e1, e2) in routing graph 705, that index(e1)<index(e2). The constraints ensure that for a flow created between a source and a sync, the index of the edges from source to sync always increase.

Below are example deadlock avoidance constraints generated by the system. As illustrated, the system is capable of associating a level, e.g., an integer, to each virtual channel (k) and edge pair (en). The system sets a maximum level. The system, in attempting to solve the expression, attempts to encode level increases along each of flows f1, f2, f3, and f4.

flow f1 implies level(e1, k)<level (e2, k)
flow f2 implies level(e2, k)<level (e3, k)
flow f3 implies level(e3, k)<level (e4, k)
flow f4 implies level(e4, k)<level (e1, k)

$VC(f1, k)$ $\text{Flow}(A, f1) \to \text{level}(e1, k) < \text{level}(e2, k)$ $\text{Flow}(B, f1)$ $\text{Flow}(C, f1)$ In block 630, the system optionally generates directionality constraints. The directionality constraints specify that two data flows targeting the same destination on the same virtual channel must use the same path through the programmable NOC once the two data flows use a common node (switch). In an embodiment, use of the directionality constraint facilitates compacting of the routing tables within the switches of the programmable NOC. Rather than encoding every destination that a packet coming into a switch of the NOC may be routed to, the routing tables are compacted by not including such data. The use of the directionality constraints facilitate this compacting of the routing table, thereby allowing for smaller and more efficient switches.

In an embodiment, for each edge e and each destination d, the system collects the group or set of data flows with a destination d that can go through edge e. For each pair of such data flows f1, f2, and virtual channel k, the system applies the directionality constraint. An example directionality constraint is shown below where A and B represent edges.

$VC(f1, k)$ $VC(f2, k)$ $\text{Flow}(A, f1) \to \text{Flow}(B, f2)$ $\text{Flow}(A, f2)$ $\text{Flow}(B, f1)$ In the example above, since flows f1, f2 of the same virtual channel k use edge A, and flow f1 also uses edge B, then flow f2 must also use edge B.

For large groups of data flows, the system is capable of factorizing the directionality constraints as shown below.
$(\bigwedge_{fi} \overline{VC(fi,k)} \vee \overline{Flow(A,fi)} \vee \overline{Flow(B,fi)}) \vee ((\bigwedge_{fi} \overline{VC(fi,k)} \vee \overline{Flow(A,fi)} \vee Flow(B, fi))$ In block 635, the system generates the expression using the Boolean variables and the constraints described herein in connection with FIG. 6.

In an embodiment, deadlock avoidance is performed sequentially, e.g., subsequent to routing the data flows. Sequential deadlock avoidance may be used in cases where the circuit design or routing problem is large and encoding deadlock constraints natively for SAT is too computationally expensive. In such cases, the system is capable of checking the routing result returned by the SAT for deadlock. The system is capable of incrementally modifying the routing result to remove deadlocks when needed. Sequential deadlock avoidance may be used in large systems to obtain a solution, sequential deadlock avoidance is not guaranteed to succeed.

In another embodiment, deadlock avoidance can be performed by running a plurality of instances of the SAT router in parallel. For example, the system (or multiple systems) is capable of executing a first instance of the SAT router operating with deadlock constraints while executing a second instance of the SAT router operating without deadlock constraints. The system is capable of selecting a routing result, e.g., the first routing result, returned by the two processes that is deadlock free.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory, as described herein, is an example of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to methods for routing a circuit design for implementation in an IC having a programmable NOC. In one aspect, a method can include determining QOS parameters for data flows of a circuit design, wherein the data flows involve transfers of data between masters and slaves through the programmable NOC, generating, using a processor, an expression having a plurality of variables representing the data flows, routing constraints, and the QOS parameters, and determining, using the processor, a routing solution for the data flows of the circuit design by initiating execution of a SAT solver using the expression.

In an aspect, the programmable network on chip is configured to implement routes for the data flows specified by the routing solution in response to, or after, booting the integrated circuit.

In another aspect, the programmable network on chip includes a plurality of interconnected switches, wherein the programmable network on chip is configured by programming routing tables of the plurality of switches to establish the routes.

In another aspect, the QOS parameters include at least one of bandwidth, traffic class, communication type, or maximal latency.

In another aspect, the constraints include conductive constraints specifying that a path between the master and the slave of each data flow exists.

In another aspect, the constraints include physical capacity constraints specifying that total bandwidth of data flows going through switches of the programmable network on chip remains less than or equal to capacities of the switches.

In another aspect, the constraints include virtual channel constraints specifying that each data flow uses one virtual channel.

In another aspect, the virtual channel constraints specify that data flows in a same group must use a compatible virtual channel.

In another aspect, the constraints include deadlock avoidance constraints that enforce acyclicity of a directed graph for each virtual channel.

In another aspect, the constraints include directionality constraints requiring that data flows having a same destination, that have a shared switch of the programmable network on chip, and are assigned a same virtual channel use the same path through the programmable network on chip from the shared switch to the destination.

One or more embodiments are directed to systems for routing a circuit design for implementation in an IC having a programmable NOC. In one aspect, a system includes a memory configured to store program code and a processor coupled to the memory. The processor, in response to executing the program code, is configured to initiate operations. The operations include determining QOS parameters for data flows of a circuit design, wherein the data flows involve transfers of data between masters and slaves through the programmable NOC, generating, using a processor, an expression having a plurality of variables representing the data flows, routing constraints, and the QOS parameters, and determining, using the processor, a routing solution for the data flows of the circuit design by initiating execution of a SAT solver using the expression.

In an aspect, the QOS parameters include at least one of bandwidth, traffic class, communication type, or maximal latency.

In another aspect, the constraints include conductive constraints specifying that a path between the master and the slave of each data flow exists.

In another aspect, the constraints include physical capacity constraints specifying that total bandwidth of data flows going through switches of the programmable network on chip remains less than or equal to capacities of the switches.

In another aspect, the constraints include virtual channel constraints specifying that each data flow uses one virtual channel.

In another aspect, the virtual channel constraints specify that data flows in a same group must use a compatible virtual channel.

In another aspect, the constraints include deadlock avoidance constraints that enforce acyclicity of a directed graph for each virtual channel.

In another aspect, the constraints include directionality constraints requiring that data flows having a same destination, that have a shared switch of the programmable network on chip, and are assigned a same virtual channel use the same path through the programmable network on chip from the shared switch to the destination.

One or more embodiments are directed to computer program products for routing a circuit design for implementation in an IC having a programmable NOC. In one aspect, a computer program product includes a computer readable storage medium having program code stored thereon. The program code is executable by a processor to perform operations including determining QOS parameters for data flows of a circuit design, wherein the data flows involve transfers of data between masters and slaves through the programmable NOC, generating, using a processor, an expression having a plurality of variables representing the data flows, routing constraints, and the QOS parameters, and determining, using the processor, a routing solution for the data flows of the circuit design by initiating execution of a SAT solver using the expression.

In an aspect, the programmable network on chip is configured to implement routes for the data flows specified by the routing solution in response to, or after, booting the integrated circuit.

In another aspect, the programmable network on chip includes a plurality of interconnected switches, wherein the programmable network on chip is configured by programming routing tables of the plurality of switches to establish the routes.

In another aspect, the QOS parameters include at least one of bandwidth, traffic class, communication type, or maximal latency.

In another aspect, the constraints include conductive constraints specifying that a path between the master and the slave of each data flow exists.

In another aspect, the constraints include physical capacity constraints specifying that total bandwidth of data flows going through switches of the programmable network on chip remains less than or equal to capacities of the switches.

In another aspect, the constraints include virtual channel constraints specifying that each data flow uses one virtual channel.

In another aspect, the virtual channel constraints specify that data flows in a same group must use a compatible virtual channel.

In another aspect, the constraints include deadlock avoidance constraints that enforce acyclicity of a directed graph for each virtual channel.

In another aspect, the constraints include directionality constraints requiring that data flows having a same destination, that have a shared switch of the programmable network on chip, and are assigned a same virtual channel use the same path through the programmable network on chip from the shared switch to the destination.

One or more embodiments are directed to a device. The device may be an IC. The device can include a processor configured to execute program code and a programmable circuitry. The device can include a programmable NOC coupling the processor and the programmable circuitry. The programmable NOC is configured, in response to booting the device, to implement routes between the processor and the programmable circuitry.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method for routing a circuit design for implementation in an integrated circuit having a programmable network on chip, the method comprising:
    determining Quality of Service (QOS) parameters for data flows of a circuit design, wherein the data flows involve transfers of data between masters and slaves through the programmable network on chip;
    generating, using a processor, an expression having a plurality of variables representing the data flows, routing constraints, and the QOS parameters;
    determining, using the processor, a routing solution for the data flows of the circuit design by initiating execution of a SAT solver using the expression; and
    wherein the constraints include directionality constraints requiring that data flows having a same destination, that have a shared switch of the programmable network on chip, and are assigned a same virtual channel use a same path through the programmable network on chip from the shared switch to the destination.

2. The method of claim 1, wherein the programmable network on chip is configured to implement routes for the data flows specified by the routing solution in response to, or after, booting the integrated circuit.

3. The method of claim 1, wherein the programmable network on chip comprises a plurality of interconnected switches, wherein the programmable network on chip is configured by programming routing tables of the plurality of switches to establish the routes.

4. The method of claim 1, wherein the QOS parameters include at least one of bandwidth, traffic class, communication type, or maximal latency.

5. The method of claim 1, wherein the constraints include conductive constraints specifying that a path between the master and the slave of each data flow exists.

6. The method of claim 1, wherein the constraints include physical capacity constraints specifying that total bandwidth of data flows going through switches of the programmable network on chip remains less than or equal to capacities of the switches.

7. The method of claim 1, wherein the constraints include virtual channel constraints specifying that each data flow uses one virtual channel.

8. The method of claim 7, wherein the virtual channel constraints specify that data flows in a same group must use a compatible virtual channel.

9. The method of claim 1, wherein the constraints include deadlock avoidance constraints that enforce acyclicity of a directed graph for each virtual channel.

10. A system for routing a circuit design for implementation in an integrated circuit having a programmable network on chip, comprising:
- a memory configured to store program code; and
- a processor coupled to the memory, wherein the processor, in response to executing the program code, is configured to initiate operations including:
- determining Quality of Service (QOS) parameters for data flows of a circuit design, wherein the data flows involve transfers of data between masters and slaves through the programmable network on chip;
- generating, using a processor, an expression having a plurality of variables representing the data flows, routing constraints, and the QOS parameters;
- determining, using the processor, a routing solution for the data flows of the circuit design by initiating execution of a SAT solver using the expression; and
- wherein the constraints include directionality constraints requiring that data flows having a same destination, that have a shared switch of the programmable network on chip, and are assigned a same virtual channel use a same path through the programmable network on chip from the shared switch to the destination.

11. The system of claim 10, wherein the programmable network on chip is configured to implement routes for the data flows specified by the routing solution in response to, or after, booting the integrated circuit.

12. The system of claim 10, wherein the programmable network on chip comprises a plurality of interconnected switches, wherein the programmable network on chip is configured by programming routing tables of the plurality of switches to establish the routes.

13. The system of claim 10, wherein the QOS parameters include at least one of bandwidth, traffic class, communication type, or maximal latency.

14. The system of claim 10, wherein the constraints include conductive constraints specifying that a path between the master and the slave of each data flow exists.

15. The system of claim 10, wherein the constraints include physical capacity constraints specifying that total bandwidth of data flows going through switches of the programmable network on chip remains less than or equal to capacities of the switches.

16. The system of claim 10, wherein the constraints include virtual channel constraints specifying that each data flow uses one virtual channel.

17. The system of claim 10, wherein the constraints include deadlock avoidance constraints that enforce acyclicity of a directed graph for each virtual channel.

18. An integrated circuit, comprising:
- a processor configured to execute program code;
- a programmable circuitry;
- a programmable network on chip coupling the processor and the programmable circuitry;
- wherein the programmable network on chip is configured, in response to booting the integrated circuit, to implement routes between the processor and the programmable circuitry to convey data flows between masters and slaves of a circuit design; and
- wherein selected data flows through the programmable network on chip having a same destination, having a shared switch of the programmable network on chip, and assigned to a same virtual channel use a same path through the programmable network on chip from the shared switch to the destination.

* * * * *